United States Patent [19]

Nishikawa et al.

[11] Patent Number: 4,927,190
[45] Date of Patent: May 22, 1990

[54] HOSE FITTING

[75] Inventors: Masayuki Nishikawa, Inazawa; Takeshi Miyazaki, Nagoya; Terumitsu Shigeki, Nagoya; Satoshi Mitzutani, Kuwana; Toru Isono, Kagamihara, all of Japan

[73] Assignee: Toyoda Gosei Co., Ltd, Nishikasugai, Japan

[21] Appl. No.: 336,814

[22] Filed: Apr. 12, 1989

[30] Foreign Application Priority Data

Mar. 30, 1987 [JP] Japan ................................. 62-47581
Mar. 31, 1987 [JP] Japan ................................. 62-78853
Mar. 31, 1987 [JP] Japan ................................. 62-78854

[51] Int. Cl.$^5$ ............................................ F16L 55/00
[52] U.S. Cl. .................................. 285/175; 285/190; 285/256; 29/510; 29/455.1; 29/508
[58] Field of Search ............... 285/175, 273, 274, 190, 285/907, 256; 29/510, 455.1, 508

[56] References Cited

U.S. PATENT DOCUMENTS

| | | |
|---|---|---|
| 1,725,286 | 8/1929 | Loughead . |
| 2,008,650 | 7/1935 | Weatherhead ...................... 285/256 |
| 2,311,663 | 2/1942 | Hunziker . |
| 2,489,890 | 11/1949 | Hufferd . |
| 3,345,090 | 10/1967 | Weatherhead . |
| 3,967,838 | 7/1976 | Legris ................................ 285/190 |
| 4,335,753 | 6/1982 | Frye ................................ 285/256 X |
| 4,601,448 | 7/1986 | Miyazaki et al. . |
| 4,603,891 | 8/1986 | Miyazaki et al. . |
| 4,624,429 | 11/1986 | Miyazaki . |
| 4,650,223 | 3/1987 | Miyazaki et al. . |
| 4,775,174 | 10/1988 | Bona ................................. 285/190 |

FOREIGN PATENT DOCUMENTS

| | | |
|---|---|---|
| 930184 | 7/1955 | Fed. Rep. of Germany ...... 285/190 |
| 3514315 | 11/1985 | Fed. Rep. of Germany . |
| 606323 | 8/1948 | United Kingdom . |
| 606873 | 8/1948 | United Kingdom . |

Primary Examiner—Dave W. Arola
Attorney, Agent, or Firm—Cushman, Darby & Cushman

[57] ABSTRACT

A hose fitting body composed of a head portion with a through hose made in the center of a pair of flat surfaces thereof, a base portion, and a sleeve is formed out of a test tube-shaped substance by plastic deformation, and a nipple is integrally fixed on the inner circumferential surface of the sleeve. The hose fitting allows for the bending of the base portion while securing a necessary cross-sectional area for the fluid delivery hole of the base portion even when the base portion is bent greatly. The light-weight construction facilitates uniform wall thickness while reducing raw material cost, and provides for fixing the nipple on the sleeve inner circumferential surface in a fluid-tight manner without brazing or drive fitting the nipple.

12 Claims, 5 Drawing Sheets

FIG. 13
FIG. 14
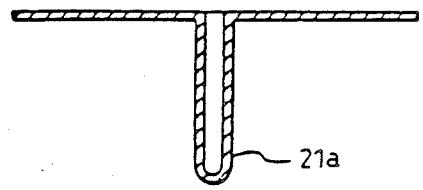
FIG. 15
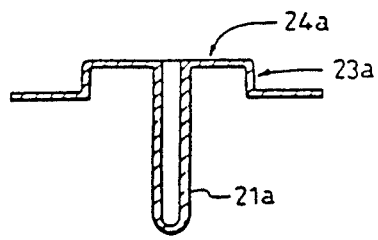
FIG. 16
FIG. 17
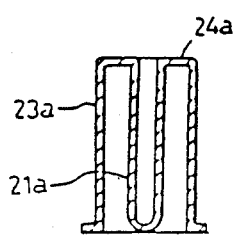
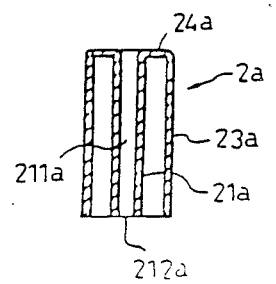

HOSE FITTING

This is a division of application Ser. No. 07/163,098, filed Mar. 2, 1988 now Pat. No. 4,854,030 filed Aug. 8, 1989.

BACKGROUND OF THE INVENTION

1. Field of the Invention

This invention relates to a hose fitting and a process for manufacturing the same.

2. Description of the Prior Art

A conventional hose fitting, illustrated in FIG. 20, comprises a hose fitting body 1' and a nipple 2'. The hose fitting body 1' is composed of a head portion 11' having a through hole 111' into which a bolt is to be inserted, a base portion 12' continuing from the head portion 11', and a cylindrical sleeve 13' continuing from the base portion 12'. The nipple 2' is fixed integrally on the bottom surface of the sleeve 13'. The sleeve 13' is formed coaxially with the nipple 2', and is caulked to fix a hose 9 after inserting the hose 9 into the nipple 2'. Further, a fluid delivery hole 211' of the nipple 2' is connected to a fluid delivery hole 121' of the base portion 12'.

In the conventional hose fitting, as shown in FIG. 20, the cross-sectional area of fluid delivery hole 121' of the base portion 12' continuing from the head portion 11' has the equal cross-sectional area to that of the fluid delivery hole 211' of the nipple 2'.

A machining process, in which a prescribed raw material is machined to a hose fitting, has been known as a process for manufacturing the conventional hose fitting.

3. Problem with the Prior Art

The conventional hose fitting is relatively heavy in weight. And since the cross-sectional area of the fluid delivery hole 121' of the base portion 12' has the equal cross-sectional area to that of the fluid delivery hole 211' of the nipple 2', the base portion 12' cannot be bent by a sharp angle without making the cross-sectional area of the fluid delivery hole 121' smaller than that of the fluid delivery hole 211' of the nipple 2' when bending the base portion 12'.

The conventional process for manufacturing the hose fitting by machining has complicated manufacturing processes, causes a large amount of material loss, and is expensive.

Furthermore, in the conventional hose fitting, the nipple 2' should be fixed on the bottom surface of the sleeve 13' in a fluid-tight manner by brazing or drive fitting the nipple 2' so as not to have the fluid passing through the fluid delivery hole 211' of the nipple 2' leaked through an engaging portion between the sleeve 13' and the nipple 2', and avoid the oil intruding into the hose end surface.

SUMMARY OF THE INVENTION

Accordingly it is an object of this invention to solve the above-mentioned problems. In other words, it is an object of this invention to provide a hose fitting having the following advantages and to provide a process for manufacturing such hose fitting economically with less material loss.

1. A hose fitting requiring less workload to bend the base portion, and offering easy work for the bending.

2. A hose fitting securing a necessary cross-sectional area as the fluid delivery hole of the base portion even when the base portion is bent greatly.

3. A hose fitting being lighter than the conventional hose fittings, having a uniform wall thickness, and requiring less raw material cost.

4. A hose fitting in which the nipple is fixed on the sleeve inner circumferential surface in a fluid-tight manner without brazing or drive fitting the nipple.

The hose fitting of this invention comprises a hose fitting body composed of a head portion which is formed by pressing a test tube-shaped substance at the bottom to flatten the cylindrical surface at the bottom while leaving space inside thereof, and then by forming a through hole in the center of the flattened cylindrical surface at the bottom, a base portion composed of the intermediate portion of the test tube-shaped substance continuing from the head portion, a sleeve composed of the opening end of the test tube-shaped substance continuing from the base portion, and a nipple integrally fixed on the inner circumferential surface of the sleeve.

It is preferred that the cross-sectional area of the fluid delivery hole of the base portion is from 5 to 30 times as much as that of the fluid delivery hole of the nipple. This is necessary to secure an adequate cross-sectional area, as the fluid delivery hole of the base portion, even after bending the base portion.

Further, it is preferred that the head portion composed of the flattened cylindrical surface at the bottom has a flat shape in which the vertical cross-sectional view the length is from 1 to 3 times as much as the height. When the above-mentioned head length is smaller than the above-mentioned head height, it is disadvantageous to secure the seal between the hose fitting and the mating member, but advantageous to secure the fluid delivery amount. Contrarily, when the head length is larger than 3 times of the head height, it is advantageous to secure the seal between the hose fitting and the mating member, but disadvantageous to secure the fluid delivery amount.

The hose fitting of this invention is manufactured by a manufacturing process comprising the following steps:

a first step for manufacturing a test tube-shaped substance whose opening end is to be sleeve and whose bottom end is to be a head portion by a plastic deformation on a metallic raw material;

a second step for forming flat top and bottom surfaces by pressing the cylindrical surface of the test tube-shaped substance at the bottom while leaving space inside thereof;

a third step for forming a through hole into which a bolt is to be inserted by punching the flat top and bottom surfaces at the center;

a fourth step for fixing a nipple having a coaxial fluid delivery hole with the opening of the test tube-shaped substance on the inner circumferential surface of the opening of the test tube-shaped substance to be the sleeve.

The metallic raw material used in the first step may be a plate-shaped substance, a square shaped substance with a large wall thickness, a rectangular solid shaped substance, or a lump of substance.

The hose fitting of this invention can be manufactured by a small workload because it is manufactured out of the test tube-shaped substance.

Less workload is required for the bending of the base portion. Accordingly, it is easy to bend the base portion of the hose fitting of this invention.

It is easy to secure a necessary cross-sectional area for the fluid delivery hole of the base portion when bending the base portion, because the cross-sectional area of the fluid delivery hole of the base portion is larger than that of the fluid delivery hole of the nipple in the hose fitting of this invention.

The hose fitting obtained by this invention is lighter than the conventional hose fitting, and has an approximately uniform wall thickness.

Since the manufacturing process of this invention is drawing, it is less expensive and easier than the conventional manufacturing process in which the hose fitting is formed by machining. And the manufacturing process of this invention offers less material loss than the conventional manufacturing process does. In addition, at least the wall thicknesses of the base portion and the sleeve can be made approximately uniform by the manufacturing process of this invention.

Fluid intrusion into the hose end surface can be prevented without fixing the nipple on the bottom surface of the sleeve by brazing or drive fitting in the hose fitting of this invention.

Furthermore, since the nipple used in the hose fitting of this invention is manufactured by drawing, it can be manufactured with less material loss than by machining. Further the wall thickness of the nipple can be manufactured to be approximately uniform.

BRIEF DESCRIPTION OF THE DRAWINGS

FIG. 13 is a cross-sectional view of the part of a plate-shaped metallic raw material for manufacturing a nipple in the second preferred embodiment.

FIG. 14 is an explanatory cross-sectional view of a nipple body formed by drawing the plate-shaped metallic raw material illustrated in FIG. 13.

FIG. 15 is an explanatory cross-sectional view of a start of an outer cylinder portion and bottom portion formed by drawing the circumferential portion of the nipple body illustrated in FIG. 14 in the direction opposite to the drawing in FIG. 14, namely in the upper direction of this figure.

FIG. 16 is an explanatory cross-sectional view of the outer cylinder portion surrounding the nipple body formed by further drawing the substance illustrated in FIG. 15.

FIG. 17 is an explanatory cross-sectional view of a nipple used in the second preferred embodiment in which the end of the outer cylinder portion is cut after making a fluid delivery hole opening on the nipple body illustrated in FIG. 16.

DETAILED DESCRIPTION OF THE INVENTION

The present invention will be hereinafter explained with reference to preferred embodiments.

First Preferred Embodiment

Figure 1:
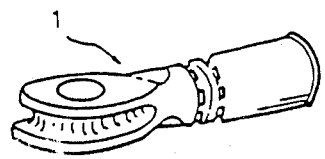
FIG. 1 is a perspective view of a hose fitting concerning a first preferred embodiment.
Figure 2:
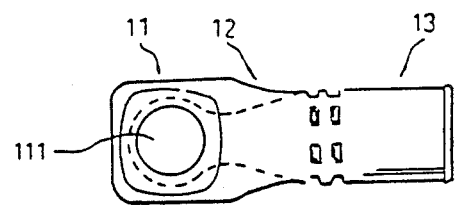
FIG. 2 is a plan view of the hose fitting illustrated in FIG. 1.
Figure 3:
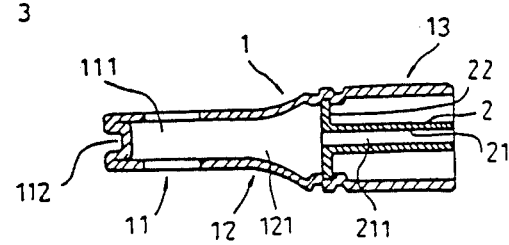
FIG. 3 is a vertical cross-sectional view of the hose fitting illustrated in FIG. 1.
Figure 4:
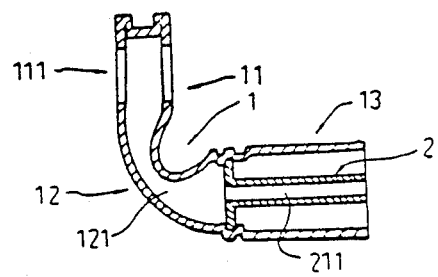
FIG. 4 is an explanatory cross-sectional view illustrating a greatly bent base portion of the hose fitting illustrated in FIG. 1.

A perspective view of a hose fitting of this preferred embodiment is illustrated in FIG. 1, a plan view of the same is illustrated in FIG. 2, and a vertical cross-sectional view of the same is illustrated in FIG. 3.

This hose fitting comprises a hose fitting body 1 and a nipple 2. The hose fitting body 1 comprises a head portion 11, a base portion 12 continuing from the head portion 11, and a sleeve 13 continuing from the base portion 12.

The head portion 11 is formed by pressing the cylindrical surface of a test tube-shaped substance at the bottom to flatten the cylindrical surface thereof at the bottom while leaving space inside thereof, and then by forming a through hole 111 in the center of the flattened cylindrical surface at the bottom.

The base portion 12 is composed of the intermediate portion of the test tube-shaped substance continuing from the head portion 11. And the sleeve 13 is composed of the opening end of the test tube-shaped substance continuing from the base portion 12.

The cross-sectional area of the fluid delivery hole 121 of the base portion 12 is from 5 to 20 times as much as that of the fluid delivery hole 211 of the nipple 2.

And the head portion 11 composed of the flattened cylindrical surface has a length approximately 1.5 times as much as a height in the vertical cross-sectional view. In addition, a concave 112 is formed in the end surface and side surfaces of head portion 11.

The nipple 2 of this preferred embodiment is fixed integrally on the inner circumferential surface of the sleeve 13. And the nipple 2 is composed of a cylindrical nipple body 21, and a flange portion 22 integrally formed on one end of the nipple body 21 to be fixed on the inner circumferential surface of a sleeve 13. The nipple 2 is manufactured out of a plate-shaped metallic raw material by drawing.

The hose fitting of this preferred embodiment is manufactured as follows:

(1) Manufacturing of the Hose Fitting Body 1

Figure 9:
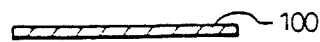
FIG. 9 is a cross-sectional view of the part of a plate shaped metallic raw material for manufacturing the hose fitting body of the first and second preferred embodiments.
Figure 10:
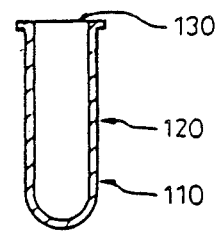
FIG. 10 is an explanatory cross-sectional view of a test tube-shaped substance manufactured by drawing the plate-shaped metallic raw material illustrated in FIG. 9.

First, a plate-shaped metallic raw material 100 shown in FIG. 9 is prepared, and is deformed plastically by drawing to manufacture a test tube-shaped substance shown in FIG. 10. The bottom end 110 of the test tube-shaped substance becomes the head portion 11 of the hose fitting body 1, and the intermediate portion 120 thereof becomes the base portion 12 of the hose fitting body 1, and the opening end 130 thereof becomes the sleeve 13 of the hose fitting body 1.

Figure 11:
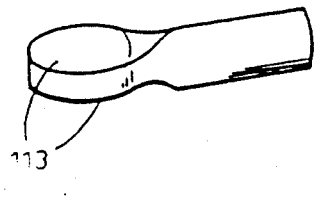
FIG. 11 is a perspective view of top and bottom surfaces formed by flattening the cylindrical surface of the test tube-shaped substance at the bottom illustrated in FIG. 10.

Then, as shown in FIG. 11, top and bottom surfaces 113 are formed by pressing the cylindrical surface of the bottom end 110 of the test tube-shaped substance. The cylindrical surface is flattened while leaving space inside the test tube-shaped substance.

Figure 12:
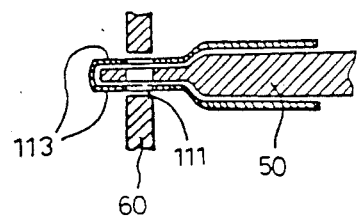
FIG. 12 is an explanatory view of a through hole formed by punching the flattened top and bottom surfaces at the center, which are formed by flattening the cylindrical surface of the test tube-shaped substance at the bottom illustrated in FIG. 11.

And then, as shown in FIG. 12, after inserting a mandrel 50 into the test tube-shaped substance with thus formed top and bottom surfaces 113, the flattened top and bottom surfaces 113 are punched at the center thereof by a tool 60 to form a through hole 111 into which a bolt is to be inserted.

In addition, as shown in FIGS. 1 through 3, the hose fitting of this invention has the concave 112 in the end surface and side surfaces of the head portion 11. The concave 112 is formed by placing prescribed dies on the end surface and side surfaces of the head portion 11 and pressing the dies in the inward direction to the hose fitting body 1; i.e. in the right, upper and lower directions in FIG. 2, and in the right direction in FIG. 3.

Thus, the hose fitting body 1 with the through hole 111 is manufactured.

(2) Installing Nipple 2 in the Hose Fitting Body 1

After inserting the nipple 2 inside the sleeve 13, the nipple 2 is fixed on the inner circumferential surface of the sleeve 13 by caulking the sleeve at one end thereof inwardly in the radial direction.

The wall thickness of the hose fitting body 1 is approximately uniform, and is manufactured with less material loss than it is manufactured by machining, since the hose fitting body 1 is manufactured out of one piece of the plate-shaped metallic raw material 100 by drawing.

As can be readily understood from FIG. 3, it is easy to secure a necessary cross-sectional area for the fluid delivery hole 121 of the base portion 12 even when bending the base portion 12, since the cross-sectional area of the fluid delivery hole 121 of the base portion 12 is from 5 to 20 times as much as that of the fluid delivery hole 211 of the nipple 2.

Further, the head portion 11 contacts with the mating member in a surface-on-surface manner, since the top and bottom surfaces 113 of the head portion 11 is flattened as illustrated in FIGS. 1 through 4, and FIG. 11. Accordingly, such an arrangement is effective to secure the seal between the hose fitting and the mating member.

Furthermore, the hose fitting of this preferred embodiment can fully bear a fastening of a considerable force when assembled with the mating member, since the hose fitting of this preferred embodiment has the head portion 11 with the concave 112 formed in the end surface and the side surfaces thereof, and the concave 112 provides a reinforcement effect.

Second Preferred Embodiment

Figure 5:
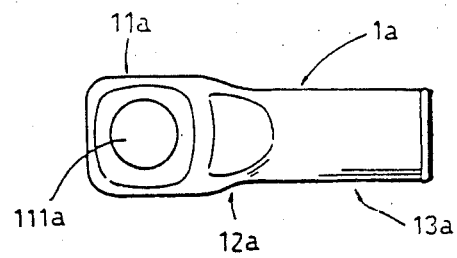
FIG. 5 is a plan view of a hose fitting concerning a second preferred embodiment.
Figure 6:
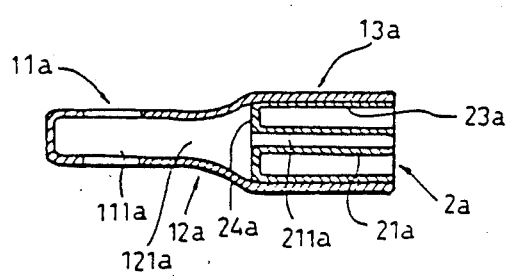
FIG. 6 is a vertical cross-sectional view of the hose fitting illustrated in FIG. 5.
Figure 7:
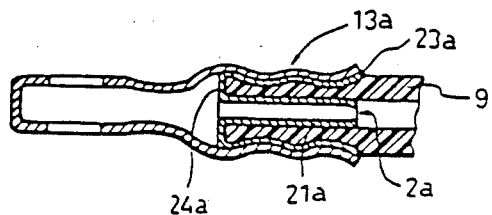
FIG. 7 is an explanatory cross-sectional view illustrating a caulked hose fitting illustrated in FIG. 5 into which a hose is inserted.
Figure 8:
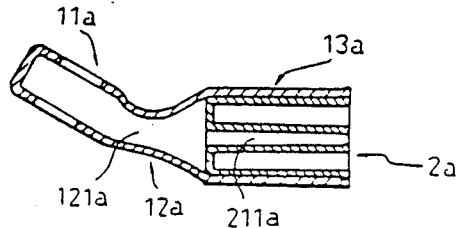
FIG. 8 is an explanatory cross-sectional view illustrating a greatly bent base portion of the hose fitting illustrated in FIG. 5.

A plan view of a hose fitting of this preferred embodiment is illustrated in FIG. 5, a vertical cross-sectional view thereof is illustrated in FIG. 6, an explanatory cross-sectional view of the hose fitting with a hose inserted and with the sleeve caulked is illustrated in FIG. 7, and an explanatory cross-sectional view of the hose fitting with a bent base portion is illustrated in FIG. 8.

A nipple 2a, shown in FIG. 17, is used in the hose fitting of this preferred embodiment. The nipple 2a is manufactured out of a plate-shaped metallic raw material by drawing.

The hose fitting of this invention comprises a hose fitting body 1a and the nipple 2a. A hose fitting body, which is identical to the one used in the first preferred embodiment but no concave 112 is formed in the end surface and the side surfaces of a head portion 11a, is used as the hose fitting body 1a.

The nipple 2a of the hose fitting of this preferred embodiment comprises a cylindrical outer cylinder portion 23a to be contacted and fixed on the inner circumferential surface of a sleeve 13a, a disk shaped bottom portion 24a continuing from one end of the outer cylinder portion 23a and extending radially, and a cylindrical nipple body 21a continuing from the bottom portion 24a and extending coaxially with the outer cylinder portion inside the outer cylinder portion.

The nipple 2a is inserted into the sleeve 13a of the hose fitting body 1a, and fixed tightly on the inner circumferential surface of the sleeve 13a.

And the cross-sectional area of a fluid delivery hole 121a of the base portion 12a is approximately from 5 to 20 times as much as that of a fluid delivery hole 211a of the nipple body 21a of the nipple 2a.

The hose fitting of this preferred embodiment is manufactured as follows:

(1) Manufacturing of the Hose Fitting Body 1a

The hose fitting body 1a of this preferred embodiment is manufactured by the identical manufacturing process for the hose fitting body 1 of the first preferred embodiment.

(2) Manufacturing of the Nipple 2a

First, a plate-shaped metallic raw material 200 shown in FIG. 13 is prepared, and is deformed plastically by drawing to form a test tube-shaped substance to be the nipple body 21a shown in FIG. 14. The drawing is identical process to the manufacturing process of the hose fitting of the first preferred embodiment; i.e. "(1) Manufacturing of the Hose Fitting Body 1".

Then, as shown in FIG. 15, the forming of the outer cylinder portion 23a surrounding the nipple body 21a coaxially, and the disk shaped bottom portion 24a continuing from one end of the outer cylinder portion 23a and extending radially is started by plastically deforming the circumferential portion of the raw material 200 continuing from the opening end of the test tube-shaped substance to be the nipple body 21a in the opposite direction; i.e. by drawing in the upper direction in FIG. 15. The drawing in the upper direction in FIG. 15 is further performed to form the outer cylinder portion 23a surrounding the periphery of the nipple body 21a integrally as shown in FIG. 16.

And then, as shown in FIG. 17, a fluid delivery hole opening 212a is formed by making an opening at the center of the end of the cylindrical nipple body 21a. And the end of the cylindrical outer cylinder portion 23a is cut to a predetermined shape.

Thus, the nipple 2a is manufactured. It comprises the following as mentioned earlier: the nipple body 21a having the fluid delivery hole opening 212a, the cylindrical outer cylinder portion 23a, and the disk shaped bottom portion 24a continuing from one end of the outer cylinder portion 23a and extending radially.

(3) Installing the Nipple 2a in the Hose Fitting Body 1a

As shown in FIG. 6, the nipple 2a is installed in the sleeve 13a of the hose fitting body 1a having a through hole 111a, and is fixed on the inner circumferential surface of the sleeve 13a of the hose fitting body 1a so that the fluid delivery hole opening 211a of the nipple 2a is coaxial with the opening of the sleeve 13a.

As shown in FIG. 7, the hose fitting of this preferred embodiment is used as a hose assembly after inserting the hose 9 between the nipple body 21a and the outer cylinder portion 23a, and caulking the sleeve 13a.

The hose fitting of this preferred embodiment has the following advantages in addition to the advantages of the first preferred embodiment.

The nipple 2a is manufactured out of one piece of plate-shaped metallic raw material 200 by drawing. Hence, the wall thickness of the nipple 2a can be made approximately uniform. And the nipple 2a can be manufactured with less material loss than it is manufactured by machining.

Further, the oil intrusion through the fluid delivery hole 121a of the base portion 12a into the hose end surface can be prevented, since the nipple body 21a and the outer cylinder portion 23a are formed integrally, and the hose 9 is inserted between them.

In addition, the fluid delivery cannot be disturbed even when the base portion 12a of the hose fitting body 1a is bent by about bent angles of 30 to 120 deg as shown in FIG. 8, since the cross-sectional area of the fluid delivery hole 121a of the base portion 12a is approximately from 5 to 20 times as much as that of the fluid delivery hole 211a of the nipple 2a. Moreover, as shown in FIG. 7, the hose 9 is inserted between the nipple body 21a and the outer cylinder portion 23a, and then the sleeve 13a is caulked. Consequently, the nipple 2a is fixed in the sleeve 13a firmly, and therefore the hose 9 disengagement from the nipple 2a can be prevented, since the sleeve 13a is in close contact with the outer cylinder portion 23a of the nipple 2a.

The hose fitting having an approximately uniform wall thickness can be manufactured out of a plate-shaped metallic raw material by a simple and convenient process; i.e. a plastic deformation. Further, the above-mentioned menufacturing process offers less material loss than the conventional manufacturing process by machining.

Third Preferred Embodiment

Figure 18:
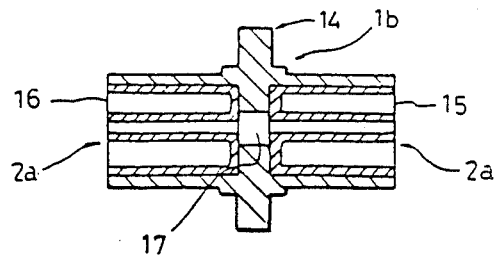
FIG. 18 is a vertical cross-sectional view of a hose intermediate fitting body used in a third preferred embodiment in which the nipples used in the second preferred embodiment are installed.

In this preferred embodiment, the nipple 2a manufactured and used in the second preferred embodiment is applied to a hose intermediate fitting body 1b for connecting two hoses. The vertical cross-sectional view of the hose intermediate fitting body 1b is shown in FIG. 18.

The hose intermediate fitting body 1b is a cylindrical metallic component having a base portion 14, two deep holes at both ends of the base portion 14 forming a first sleeve 15 and a second sleeve 16 in which the nipples 2a are installed. The two deep holes are connected by an internal through hole 17 having less diameter than the diameter of the deep holes which works as a fluid delivery hole. In addition, a projection for engaging with a mating member is formed on and around the outer circumferential surface of the base portion 14 of the hose intermediate fitting body 1b.

The first sleeve 15 and the second sleeve 16 of the hose intermediate fitting body 1b are caulked after installing the nipples 2a into the first sleeve 15 and the second sleeve 16, and inserting the hoses 9 into the nipples 2a. In this case, too, the fluid intrusion through the internal through hole 17 into the end surfaces of the hoses 9 can be prevented without brazing or drive fitting the nipples 2a to the hose intermediate fitting body 1b.

Fourth Preferred Embodiment

Figure 19:
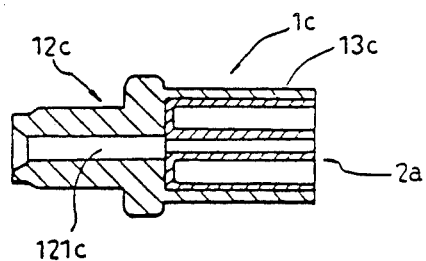
FIG. 19 is a vertical cross-sectional view of a hose fitting body used in a fourth preferred embodiment in which the nipple used in the second preferred embodiment is installed.
Figure 20:
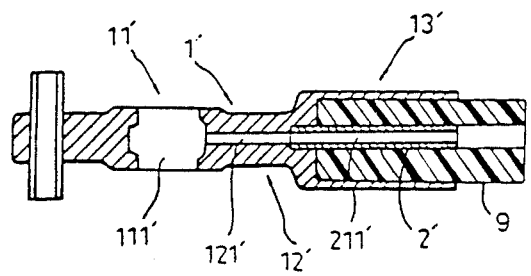
FIG. 20 is an explanatory cross-sectional view of a conventional hose fitting.

In this preferred embodiment, the nipple 2a manufactured and used in the second preferred embodiment is applied to a hose fitting body 1c whose vertical cross-sectional view is shown in FIG. 19.

The hose fitting body 1c has a base portion 12c having a fluid delivery hole 121c, and a sleeve 13c formed continually from one end of the base portion 12c. The nipple 2a is installed in the sleeve 13c. After inserting a hose into the nipple 2a, the sleeve 13c is caulked so as to press the outer cylinder portion of the nipple 2a and the outer circumferential surface of the hose. In this case, too, the fluid intrusion through the fluid delivery hole 121c into the hose end surface can be prevented without brazing or drive fitting the nipple 2a to the hose fitting body 1c.

Obviously, this invention is not limited to the above teachings explained as the preferred embodiments. Depending on objects or usages, numerous modifications and variations of this invention can be given preferred embodiments in right of this invention.

Hence, the hose fitting of this invention is not limited to the case where the cross-sectional area of the fluid delivery hole of the base portion is approximately from 5 to 20 times as much as that of the fluid delivery hole of the nipple. The cross-sectional area of the fluid delivery hole of the base portion can be freely made greater than that of the fluid delivery hole of the nipple. Such modification on the ratio of the cross-sectional areas can be freely set by changing the pressing degree of the cylindrical surface at the bottom of the test tube-shaped substance manufactured in the first step of the above-mentioned hose fitting manufacturing process.

Further, the nipple may not necessarily be manufactured by drawing like the nipple 2a of the second preferred embodiment. It may be manufactured by machining. In addition, the nipple may be manufactured not only out of the plate-shaped metallic raw material but also out of a rectangular solid shaped substance having a large wall thickness by cold forming.

Furthermore, when menufacturing a hose assembly comprising a hose and hose fittings, the hose may be first inserted into the nipple, and then the nipple with the hose inserted may be installed in the sleeve of the hose fitting body, contrary to the procedure of the above-mentioned preferred embodiments; i.e. the nipple is first inserted into the sleeve of the hose fitting body, and then the hose is inserted in the nipple.

What is claimed is:

1. A hose fitting comprising:

a hose fitting body including: a head portion having at least two flattened surfaces disposed parallel to each other and a fluid delivery through hole formed in the center of said flattened surfaces; a base portion continuing from said head portion and having a hollow truncated cone shape; and a cylindrical sleeve portion continuing from said base portion, wherein said hose fitting body is integrally formed from a test tube-shaped workpiece, said flattened surfaces of said head portion being formed by pressing said test tube-shaped workpiece from opposite sides of its closed end in a manner parallel to each other while leaving space inside thereof, said base portion being formed of the intermediate portion of said test tube-shaped workpiece, and said sleeve portion being formed from the open end of said test tube-spaced workpiece, and a nipple integrally fixed on the inner circumferential surface of said sleeve portion and having a fluid delivery hole therethrough.

2. A hose fitting according to claim 1, wherein a cross-sectional area of the fluid delivery hole of said base portion is from 5 to 30 times as much as a cross-sectional area of the fluid delivery hole of said nipple.

3. A hose fitting according to claim 2, wherein said nipple comprises: a cylindrical outer cylinder portion to be contacted and fixed on the inner circumferential surface of said sleeve portion of said hose fitting body, a disk-shaped bottom portion continuing from one end of said outer cylinder portion and extending radially in a manner perpendicular to said outer cylinder portion; and said nipple includes cylindrical nipple body continuing from said bottom portion, extending coaxially with said outer cylinder portion inside said outer cylinder portion and having a length identical with the length of said outer cylinder portion.

4. A hose fitting according to claim 1, wherein said flattened surfaces of said head portion have a length in the longitudinal direction thereof being from 1 to 3 times as much as a height of said head portion in the vertical cross-sectional view of said head portion.

5. A hose fitting according to claim 4, wherein said nipple comprises: a cylindrical outer cylinder portion to be contacted and fixed on the inner circumferential surface of said sleeve portion of said hose fitting body; a disk-shaped bottom portion continuing from one end of said outer cylinder portion and extending radially in a manner perpendicular to said outer cylinder portion; and said nipple includes cylindrical nipple body continuing from said bottom portion, extending coaxially with said outer cylinder portion inside said outer cylinder portion and having a length identical with the length of said outer cylinder portion.

6. A hose fitting according to claim 1, wherein said head portion has a concave surface formed in the end surface and side surfaces thereof, and the bottom portion of said concave surface is disposed in a manner perpendicular to said flattened surfaces.

7. A hose fitting according to claim 1, wherein said nipple comprises: a cylindrical nipple body having a length identical with the length of said sleeve portion of said hose fitting body; and an integrally formed flange portion at one end of said nipple body to be fixed on the inner circumferential surface of said sleeve portion, and said flange being disposed perpendicular to said sleeve portion.

8. A hose fitting according to claim 1, wherein said nipple comprises: a cylindrical outer cylinder portion to be contacted and fixed on the inner circumferential surface of said sleeve portion of said hose fitting body: a disk-shaped bottom portion continuing from one end of said outer cylinder portion and extending radially in a manner perpendicular to said outer cylinder portion; and said nipple includes cylindrical nipple body continuing from said bottom portion, extending coaxially with said outer cylinder portion inside said outer cylinder portion and having a length identical with the length of said outer cylinder portion.

9. A hose fitting, comprising:
a hose fitting body including: a base portion having opposite ends and an internal through hole; and cylindrical first and second sleeve portions continuing from the ends of said base portions and having inner circumferential surfaces; and
nipples including a cylindrical outer cylinder portion to be contacted and fixed on the inner circumferential surfaces of said first and second sleeve portions of said hose fitting body; a disk-shaped bottom portion continuing from one end of said outer cylinder portion and extending radially in a manner perpendicular to said outer cylinder portion; and a cylindrical nipple body continuing from said bottom portion, extending coaxially with said outer cylinder portion inside said outer cylinder portion and having a length identical with the length of said outer cylinder portion.

10. A hose fitting, comprising:
a hose fitting body including: a base portion having an end and an internal through hole; and a sleeve portion continuing from one end of said base portion and having an inner circumferential surface; and
a nipple including: a cylindrical outer cylinder portion to be contacted and fixed on the inner circumferential surface of said sleeve portion of said hose fitting body; a disk-shaped bottom portion continuing from one end of said outer cylinder portion and extending radially in a manner perpendicular to said outer cylinder portion; and a cylindrical nipple body continuing from said bottom portion, extending coaxially with said outer cylinder portion inside said outer cylinder portion and having a length identical with the length of said outer cylinder portion.

11. A hose fitting, comprising:
a hose fitting body integrally made of a test tube-shaped workpiece and including; a head portion made of the closed end portion of said test tube-shaped workpiece, having a pair of flat surfaces and a side wall connecting said flat surfaces, said flat surfaces being disposed parallel to each other and each having a hole spaced in its center; a base portion having a hollow truncated cone shape made of the intermediate portion of said test tube-shaped workpiece and connected to said side wall of said head portion; and a sleeve portion having a cylindrical shape, made of the opening end of said test tube-shaped workpiece and connected to said base portion; and
a nipple integrally fixed on the inner circumferential surface of said sleeve portion.

12. A hose fitting, comprising:
a hose fitting body including: a head portion having at least two flattened surfaces disposed parallel to each other, a through hole formed in the center of said flattened surfaces, and a concave surface formed in the end surface and side surfaces of said head portion and having the bottom portion thereof disposed perpendicular to said flattened surfaces; a base portion continuing from said head portion and having a hollow truncated cone shape; and a sleeve portion continuing from said base portion;

wherein said hose fitting body is integrally formed from a test tube-shaped workpiece, said flattened surfaces of said head portion are formed by pressing said test tube-shaped workpiece at the closed end thereof in a manner parallel to each other while leaving space inside thereof, said base portion if formed of the intermediate portion of said test tube-shaped workpiece, and said sleeve portion is formed of the opening end of said test tube-shaped workpiece; and a nipple integrally fixed on the inner circumferential surface of said sleeve portion.

* * * * *